(12) United States Patent
Ashida

(10) Patent No.: US 8,274,259 B2
(45) Date of Patent: Sep. 25, 2012

(54) METHOD AND CHARGE-UP CIRCUIT CAPABLE OF ADJUSTING CHARGE-UP CURRENT

(75) Inventor: Keiichi Ashida, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 890 days.

(21) Appl. No.: 12/189,414

(22) Filed: Aug. 11, 2008

(65) Prior Publication Data

US 2009/0051329 A1 Feb. 26, 2009

(30) Foreign Application Priority Data

Aug. 23, 2007 (JP) ................. 2007-217223

(51) Int. Cl.
H02J 7/00 (2006.01)
H02J 7/16 (2006.01)
(52) U.S. Cl. ........ 320/128; 320/134; 320/140; 320/137; 320/136
(58) Field of Classification Search .................. 320/128, 320/163, 134, 135, 136, 138, 132, 137, 140, 320/141, 142, 143, 145, 148, 149, 127
See application file for complete search history.

(56) References Cited

U.S. PATENT DOCUMENTS

| 5,898,234 | A  | * | 4/1999  | Kitagawa ....................... 307/48 |
| 6,014,030 | A  | * | 1/2000  | Smith et al. .................. 324/705 |
| 6,836,095 | B2 | * | 12/2004 | Fogg .............................. 320/128 |
| 7,656,127 | B1 | * | 2/2010  | Shutt et al. .................... 320/134 |
| 2004/0095095 | A1 | * | 5/2004 | Yamamoto et al. ........... 320/128 |
| 2005/0040791 | A1 | * | 2/2005 | Chesnau et al. .............. 320/128 |
| 2007/0075682 | A1 | * | 4/2007 | Guang et al. .................. 320/128 |
| 2007/0216357 | A1 | * | 9/2007 | Ibaraki .......................... 320/128 |
| 2007/0290655 | A1 | * | 12/2007 | Nate et al. .................... 320/163 |

FOREIGN PATENT DOCUMENTS

| CN | 1499691 A   | 5/2004  |
| CN | 101071949   | 11/2007 |
| JP | 63-3503     | 11/1988 |
| JP | 9-271147    | 10/1997 |
| JP | 10-136577   | 5/1998  |
| JP | 2962246     | 8/1999  |

(Continued)

OTHER PUBLICATIONS

Apr. 30, 2010 Chinese official action in connection with counterpart Chinese patent application.

(Continued)

Primary Examiner — Edward Tso
Assistant Examiner — Alexis Boateng
(74) Attorney, Agent, or Firm — Cooper & Dunham LLP

(57) ABSTRACT

A charge-up circuit includes a charge-up transistor configured to supply a charge-up current to a secondary battery in accordance with a control signal, a detection resistor connected in series with the charge-up transistor to detect the charge-up current, a current-to-voltage conversion circuit configured to generate and output a monitor voltage in accordance with the charge-up current based on each voltage at both end terminals of the detection resistor, a reference voltage generator configured to generate a predetermined reference voltage and including a voltage adjusting mechanism to generate the reference voltage from the constant voltage so that the charge-up current becomes a desired current, and a charge-up current control circuit configured to control the charge-up transistor so that the monitor voltage becomes the reference voltage.

11 Claims, 6 Drawing Sheets

FOREIGN PATENT DOCUMENTS

| | | |
|---|---|---|
| JP | 2004-120102 | 4/2004 |
| JP | 2004-356118 | 12/2004 |
| JP | 2005-50055 | 2/2005 |
| JP | 2005-253128 | 9/2005 |
| JP | 2007-306654 | 11/2007 |
| KR | 2004-41063 | 7/2008 |

OTHER PUBLICATIONS

Jun. 22, 2010 Korean official action in connection with counterpart Korean patent application.

Oct. 27, 2010 Chinese official action in connection with a counterpart Chinese patent application.

* cited by examiner

METHOD AND CHARGE-UP CIRCUIT CAPABLE OF ADJUSTING CHARGE-UP CURRENT

TECHNICAL FIELD

The present disclosure relates to a charge-up circuit, and more particularly, to a charge-up circuit capable of adjusting charge-up current.

BACKGROUND ART

Recently, a variety of different types of electric equipment such as mobile phones, digital cameras, personal computers and so on have been widely developed. Such electric equipment commonly includes a secondary battery that supplies power to the electric equipment because the secondary battery can be used repeatedly by recharging using a charge-up circuit.

FIG. 1 is a circuit diagram of a known charge-up circuit. In FIG. 1, the charge-up circuit includes a current-to-voltage conversion circuit 101, a charge-up current control circuit 102, a reference voltage generator 103, a PMOS transistor 104, a resistor $R_{sen}$, and a secondary battery 120. The resistor $R_{sen}$ is used for detecting a charge-up current $i_{chg}$ to the secondary battery 120. The current-to-voltage conversion circuit 101 generates and outputs a charge-up-current monitor voltage CCMON by converting the charge-up current $i_{chg}$ flowing through the resistor $R_{sen}$ to a voltage. The charge-up current control circuit 102 controls the PMOS transistor 104 so that the charge-up-current monitor voltage CCMON becomes a predetermined reference voltage CCREF.

The current-to-voltage conversion circuit 101 includes a differential amplifier 111 and resistors R101 and R102. Generally, the differential amplifier 111 has an input offset. Accordingly, an offset adjustment mechanism is employed to eliminate the input offset of the differential amplifier 111 so as to generate the charge-up-current monitor voltage CCMON accurately for the charge-up current $i_{chg}$ flowing through the resistor $R_{sen}$.

FIG. 2 is a circuit diagram of the differential amplifier 111 of FIG. 1. In FIG. 2, the differential amplifier 111 includes NMOS transistors M111 and M112, PMOS transistors M113 and M114, resistors R111 and R112 for trimming, and a current source 113. The NMOS transistors M111 and M112 form a differential pair of the differential amplifier 111. Similarly, the PMOS transistors M113 and M114 also form a differential pair. Each resistor R111 and R112 is connected in series between the corresponding NMOS transistor M111 and M112 and the current source 113, respectively. The differential amplifier 111 is adjusted by trimming of the resistors R111 and R112 so as to eliminate the input offset.

However, when an input offset adjustment is performed for the above-described differential amplifier 111, fluctuation of 0.5 mv in the input offset of the differential amplifier 111 may be generated due to variation in trimming accuracy. When a fluctuation of 0.5 mv in the input offset of the differential amplifier 111 is generated, the charge-up current $i_{chg}$ deviates by $1/(2 \times r_{sen})$ mA where the resistance of the resistor $R_{sen}$ is $r_{sen}$, indicating that the charge-up current $i_{chg}$ deviates by 5 mA when the resistance $r_{sen}=0.1\Omega$. Thus, it is difficult to achieve further reduction of the fluctuation in the charge-up current $i_{chg}$.

BRIEF SUMMARY

This patent specification describes a novel charge-up circuit that includes a charge-up transistor configured to supply a charge-up current to a secondary battery in accordance with a control signal, a detection resistor connected in series with the charge-up transistor to detect the charge-up current, a current-to-voltage conversion circuit configured to generate and output a monitor voltage in accordance with the charge-up current based on each voltage at both end terminals of the detection resistor, a reference voltage generator configured to generate a predetermined reference voltage and including a voltage adjusting mechanism to generate the reference voltage from the constant voltage so that the charge-up current becomes a desired current, and a charge-up current control circuit configured to control the charge-up transistor so that the monitor voltage becomes the reference voltage.

This patent specification further describes a novel control method used in a charge-up circuit that includes a charge-up transistor configured to supply a charge-up current to a secondary battery in accordance with a control signal, and a detection resistor connected in series with the charge-up transistor to detect the charge-up current. The control method comprises generating a voltage in accordance with the charge-up current based on each voltage at both end terminals of the detection resistor, and controlling the charge-up transistor so that a generated voltage becomes a predetermined reference voltage. The reference voltage is adjusted so that the charge-up current becomes a desired current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
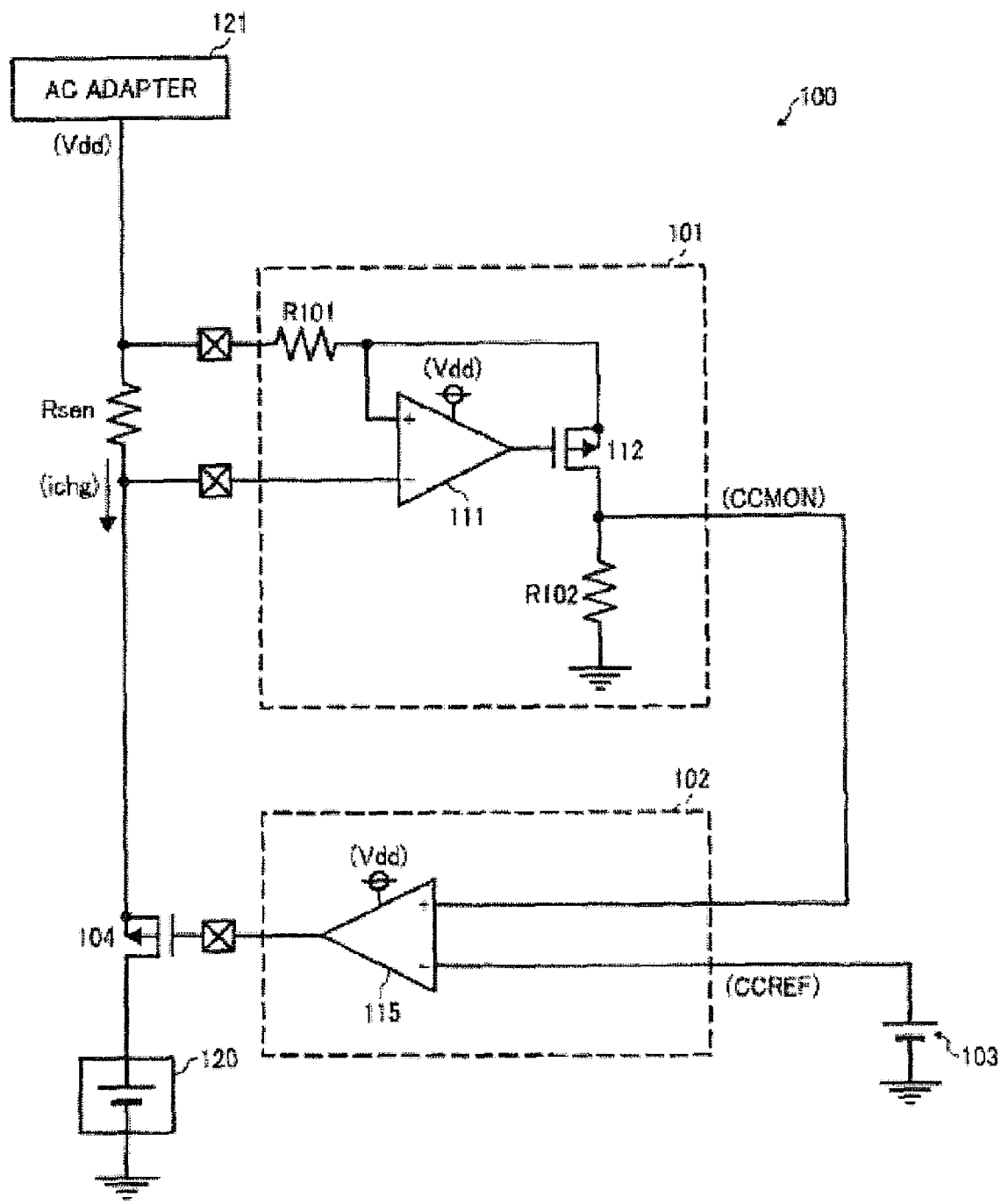
FIG. 1 is a circuit diagram of a known charge-up circuit.
Figure 2:
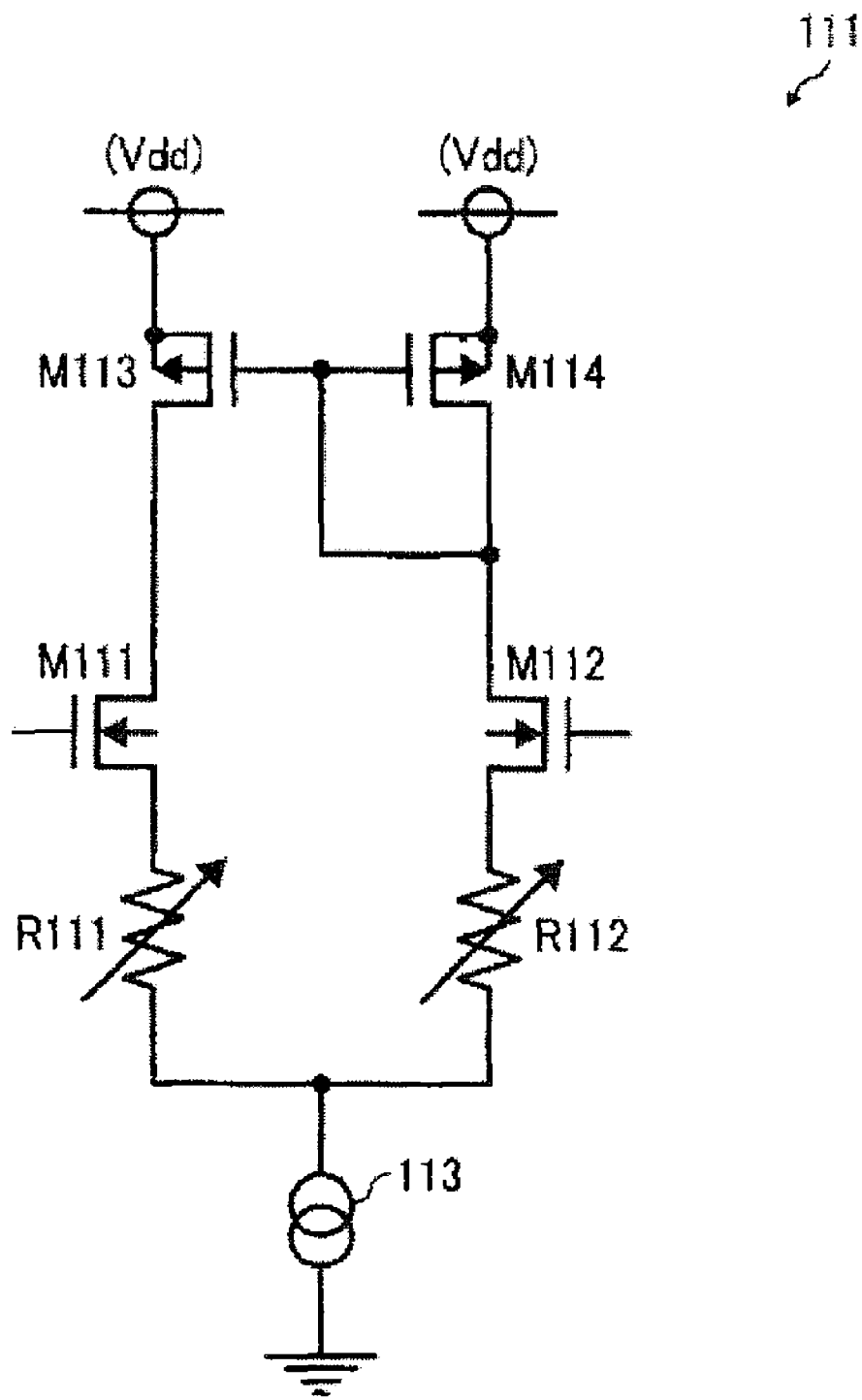
FIG. 2 a circuit diagram of the differential amplifier of FIG. 1.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Figure 3:
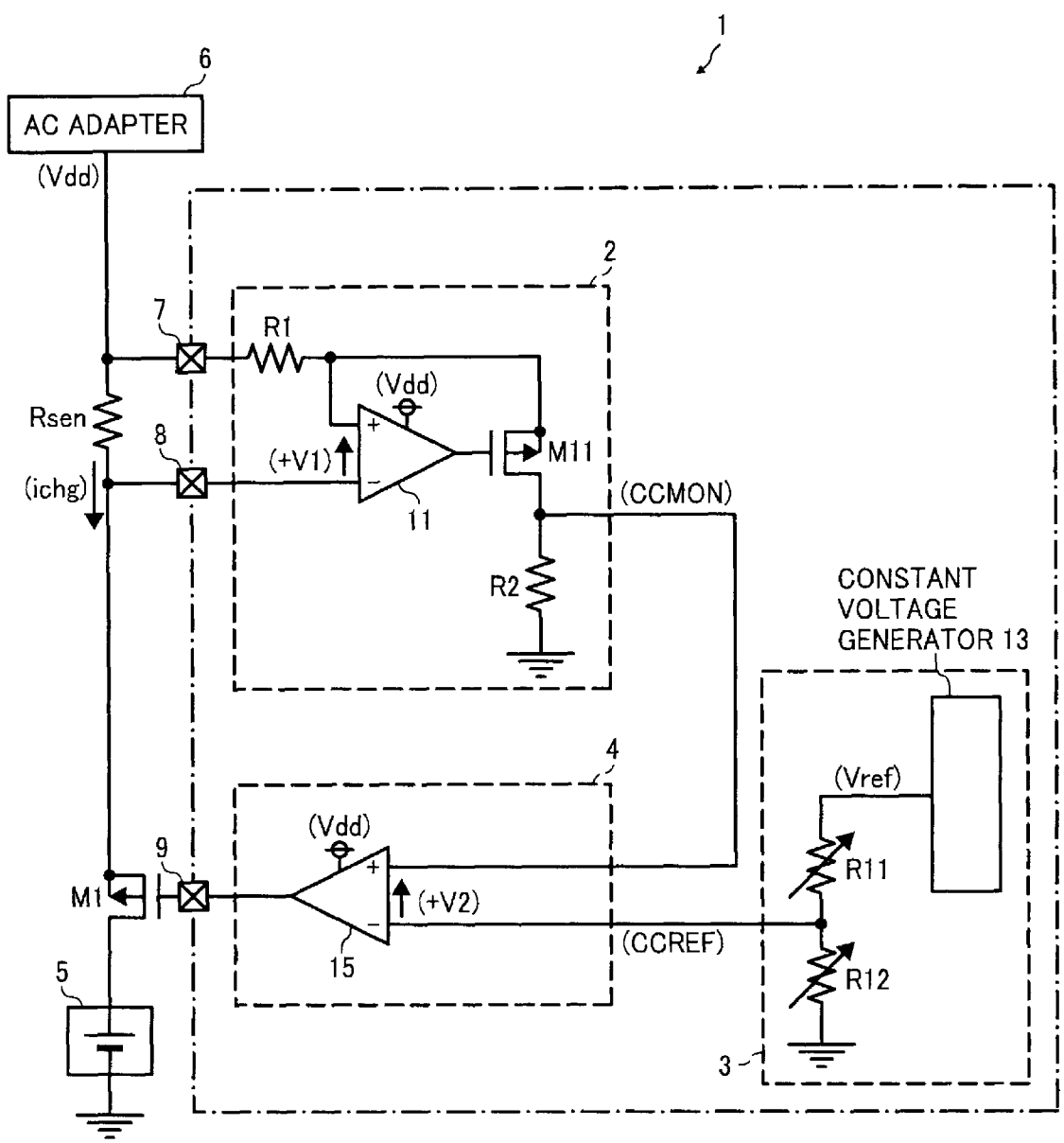
FIG. 3 is a circuit diagram of a charge-up circuit according to a first embodiment of the present invention.

Referring now to the drawings, wherein like reference numerals designate identical or corresponding parts throughout the several views, particularly to FIG. 3, a charge-up circuit according to exemplary embodiment is described.

First Embodiment

FIG. 3 is a circuit diagram of a charge-up circuit according to a first example embodiment. The charge-up circuit 1 charges a secondary battery 5 such as a lithium battery from an AC adapter 6 that is a power source with a predetermined charge-up current $i_{chg}$.

In FIG. 3, the charge-up circuit 1 includes a resistor $R_{sen}$, a charge-up transistor M1 that is formed of a PMOS transistor, a current-to-voltage conversion circuit 2, a reference voltage generator 3, a charge-up current control circuit 4, and a secondary battery 5. The resistor $R_{sen}$ is used to detect a charge-up current $i_{chg}$ to the secondary battery 5. The charge-up transistor M1 supplies the charge-up current $i_{chg}$ to the secondary battery 5 in accordance with a control signal input to a gate of the charge-up transistor M1. The current-to-voltage conversion circuit 2 generates and outputs a charge-up-current monitor voltage (hereinafter monitor voltage) CCMON by converting the charge-up current $i_{chg}$ flowing through the resistor $R_{sen}$ to a voltage. The reference voltage generator 3 generates a reference voltage CCREF. The charge-up current control circuit 4 controls the charge-up transistor M1 so that the monitor voltage CCMON becomes the reference voltage CCREF. The current-to-voltage conversion circuit 2 forms a current-to-voltage conversion circuit unit, the reference voltage generator 3 forms a reference voltage generation circuit unit, and the charge-up current control circuit 4 forms a charge-up current control circuit unit. The current-to-voltage conversion circuit 2, the reference voltage generator 3, and the charge-up current control circuit 4 may be integrated on a single chip.

The current-to-voltage conversion circuit 2 includes a differential amplifier 11, a PMOS transistor M11 and resistors R1 and R2. The reference voltage generator 3 includes a constant voltage generator 13 that generates and outputs a predetermined voltage $V_{ref}$, and variable resistors R11 and R12. The charge-up current control circuit 4 includes an error amplifier 15. Hereinafter, a resistance of the resistor $R_{sen}$ is $r_{sen}$, and resistances of the resistors R1 and R2 are r1 and r2, respectively.

The resistor $R_{sen}$ and the charge-up transistor M1 are connected in series between an output terminal of the AC adapter 6 and a positive electrode of the secondary battery 5. A power supply voltage Vdd is output from the output terminal of the AC adapter 6. A connection node between the output terminal of the AC adapter 6 and the resistor $R_{sen}$ is connected to a connection terminal 7. A connection node between the resistor $R_{sen}$, and a source of the charge-up transistor M1 is connected to a connection terminal 8.

The resistor R1, the PMOS transistor M11, and the resistor R2 are connected in series between the connection terminal 7 and ground. A connection node between the resistor R1 and the PMOS transistor M1 is connected to a non-inverted input terminal of the differential amplifier 11. An inverted input terminal of the differential amplifier 11 is connected to the connection terminal 8. An output terminal of the differential amplifier 11 is connected to a gate of the PMOS transistor M11. A connection node between the PMOS transistor M11 and the resistor R2 is an output terminal of the current-to-voltage conversion circuit 2 to output the monitor voltage CCMON.

The variable resistors R11 and R12 are connected in series between an output terminal of the constant voltage generator and ground. The reference voltage CCREF is output from a connection node between the variable resistors R11 and R12. The monitor voltage CCMON is input to a non-inverted input terminal of the error amplifier 15, and the reference voltage CCREF is input to an inverted input terminal of the error amplifier 15. An output terminal of the error amplifier 15 is connected to a gate of the charge-up transistor M1 through a connection terminal 9.

In this circuit configuration, when the charge-up current $i_{chg}$ flows through the resistor $R_{sen}$, a voltage difference ($i_{chg} \times R_{sen}$) is generated across the resistor $R_{sen}$. Each voltage at both terminals of the resistor $R_{sen}$ is input to the current-to-voltage conversion circuit 2. The differential amplifier 11 amplifies the voltage difference ($i_{chg} \times R_{sen}$) at a ratio of (r2/r1) and outputs an amplified voltage as the monitor voltage CCMON. When the differential amplifier 11 has an input offset voltage of +V1 in a direction from the inverted terminal to the non-inverted input terminal of the differential amplifier 11, the monitor voltage CCMON is expressed by a following formula (1), $$CCMON = (i_{chg} \times r_{sen} - V1) \times (r2/r1) \tag{1}$$

The error amplifier 15 of the charge-up current control circuit 4 controls the charge-up transistor M1 so that the monitor voltage CCMON becomes the reference voltage CCREF. When the error amplifier 15 has an input offset voltage of +V2 in a direction from the inverted terminal to the non-inverted input terminal, the transistor M1 is controlled by the error amplifier 15 so that a following formula (2) holds, $$CCREF = CCMON - V2 \tag{2}$$

From formulas (1) and (2), a relation between the reference voltage CCREF and the charge-up current $i_{chg}$ can be expressed by a following formula (3), $$CCREF = (i_{chg} \times r_{sen} - V1) \times (r2/r1) - V2 \tag{3}$$

Since the resistance $r_{sen}$ in formula (3) is a known value, a voltage CCREF1 of the reference voltage CCREF can be determined by measuring V1, V2 and (r2/r1) with a following formula (4), $$CCREF1 = (i_{chg1} \times r_{sen} - V1) \times (r2/r1) - V2 \tag{4}$$

The charge-up current $i_{chg}$ can be adjusted to be a setting current value $i_{chg}1$ by adjusting resistances by trimming of the resistors R11 and/or R12 so that the reference voltage CCREF becomes the voltage value CCREF1 expressed by the formula (4).

Thus, the charge-up current $i_{chg}$ can be adjusted to a desired value without being affected by fluctuation in bias current and fluctuation in absolute value of resistance due to variation during manufacturing. In this case, a voltage of 1 mV in the reference voltage CCREF corresponds to the charge-up current of $(r2/r1) \times (1/r_{sen})$ mA. Accordingly, trimming accuracy can be increased if the ratio of (r2/r1) is made small. For example, when $r_{sen} = 0.1\Omega$ and r2/r1=0.1, a voltage of 1 mV in the reference voltage CCREF corresponds to the charge-up current of 1 mA. Therefore, it is possible to improve trimming accuracy over that of a conventional circuit with no trimming.

Figure 4:
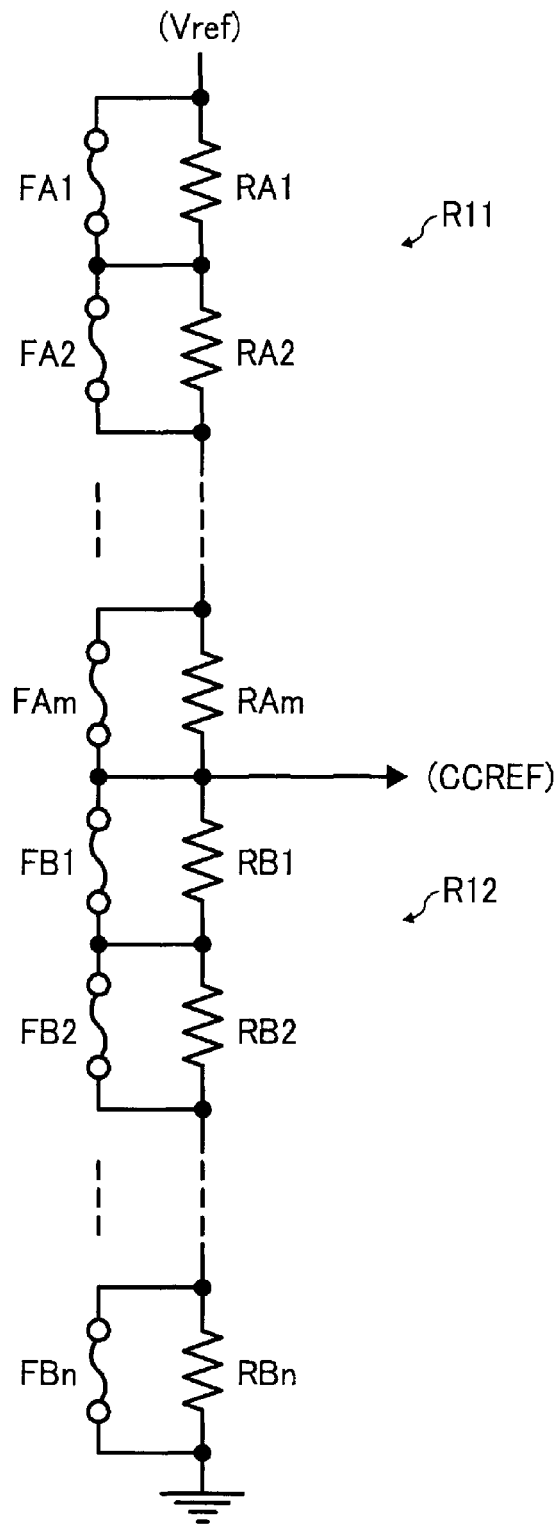
FIG. 4 is an actual circuit diagram of variable resistors in a reference circuit of FIG. 3.

FIG. 4 is an actual circuit diagram of the variable resistors R11 and R12 in the reference circuit 3. In FIG. 4, the variable resistor R11 includes m number of fixed resistor RA1 through RAm connected in series (where m is positive integer), and fuses FA1 through FAm each of which is connected in parallel with corresponding fixed resistor RA1 through RAm. Similarly, the variable resistor R12 includes n number of fixed resistor RB1 through RBn also connected in series (where n is positive integer), and fuses FB1 through FBn each of which is also connected in parallel with corresponding fixed resistor RB1 through RBn.

The resistances of the resistors R11 and/or R12 is adjusted by selectively cutting the fuses FA1 through FAm and FB1 through FBn with trimming so that the reference voltage CCREF becomes the voltage value CCREF1 as expressed by formula (4) described above. Accordingly, the charge-up current $i_{chg}$ can be adjusted to a setting current value $i_{chg}1$. The resistances of the fixed resistors RA1 through RAm and the fixed resistors RB1 through RBn can be either the same or different.

The charge-up circuit 1 according to the first example embodiment converts a current flowing through the resistor $R_{sen}$ to a voltage to generate the monitor voltage CCMON, and controls the charge-up transistor M1 so that the monitor voltage CCMON becomes the reference voltage CCREF. In this charge-up circuit 1, the reference voltage CCREF can be set arbitrarily because the reference voltage CCREF is generated by dividing the constant voltage $V_{ref}$ with the variable resistors R11 and R12. Consequently, the charge-up current to charge up a secondary battery can be adjusted accurately to a desired current.

Second Embodiment

In the charge-up circuit 1 according to the first example embodiment, there is a possibility that, if the differential amplifier 11 of the current-to-voltage conversion circuit 2 has an input offset that reduces a potential difference generated between both terminals of the resistor R1, the monitor voltage CCMON may become 0 v even when a current flows through the resistor $R_{sen}$.

Figure 5:
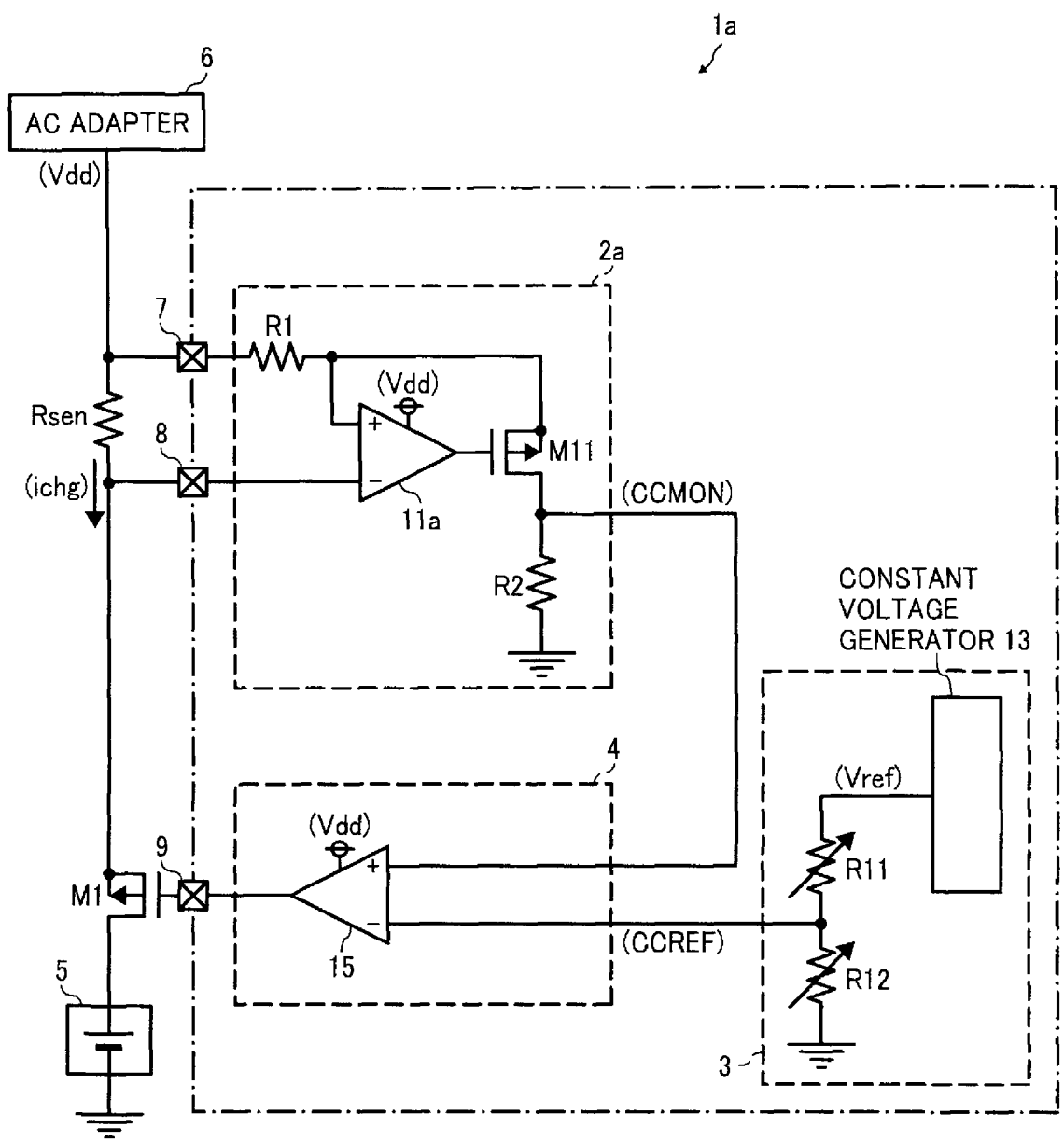
FIG. 5 is a circuit diagram of a charge-up circuit according to a second embodiment.

FIG. 5 is a circuit diagram of a charge-up circuit according to a second example embodiment. The charge-up circuit according to the second embodiment can adjust an input offset so as to have a large input offset larger than the input offset caused by variation during fabrication.

In FIG. 5, identical reference characters are assigned to identical or similar circuit members shown in FIG. 3 and descriptions thereof are omitted. Further, the charge-up circuit 1 shown in FIG. 3 is changed to a charge-up circuit 1a. Similarly, the differential amplifier 11 is changed to a differential amplifier 11a, and the current-to-voltage conversion circuit 2 is changed to a current-to-voltage conversion circuit 2a.

The charge-up circuit 1a charges the secondary battery 5 such as a lithium battery from an AC adapter 6 that is a power source with a predetermined charge-up current $i_{chg}$.

In FIG. 5, the charge-up circuit 1a includes a resistor $R_{sen}$, a charge-up transistor M1, a current-to-voltage conversion circuit 2a, a reference voltage generator 3, a charge-up current control circuit 4, and a secondary battery 5. The current-to-voltage conversion circuit 2a generates and outputs a charge-up-current monitor voltage CCMON by converting the charge-up current flowing through the resistor $R_{sen}$ to a voltage. Further, the current-to-voltage conversion circuit 2a includes a differential amplifier 11a, a PMOS transistor M11 and resistors R1 and R2. The current-to-voltage conversion circuit 2a forms a current-to-voltage conversion circuit unit. The current-to-voltage conversion circuit 2a, the reference voltage generator 3 and the charge-up current control circuit 4 may be integrated on a single chip.

Figure 6:
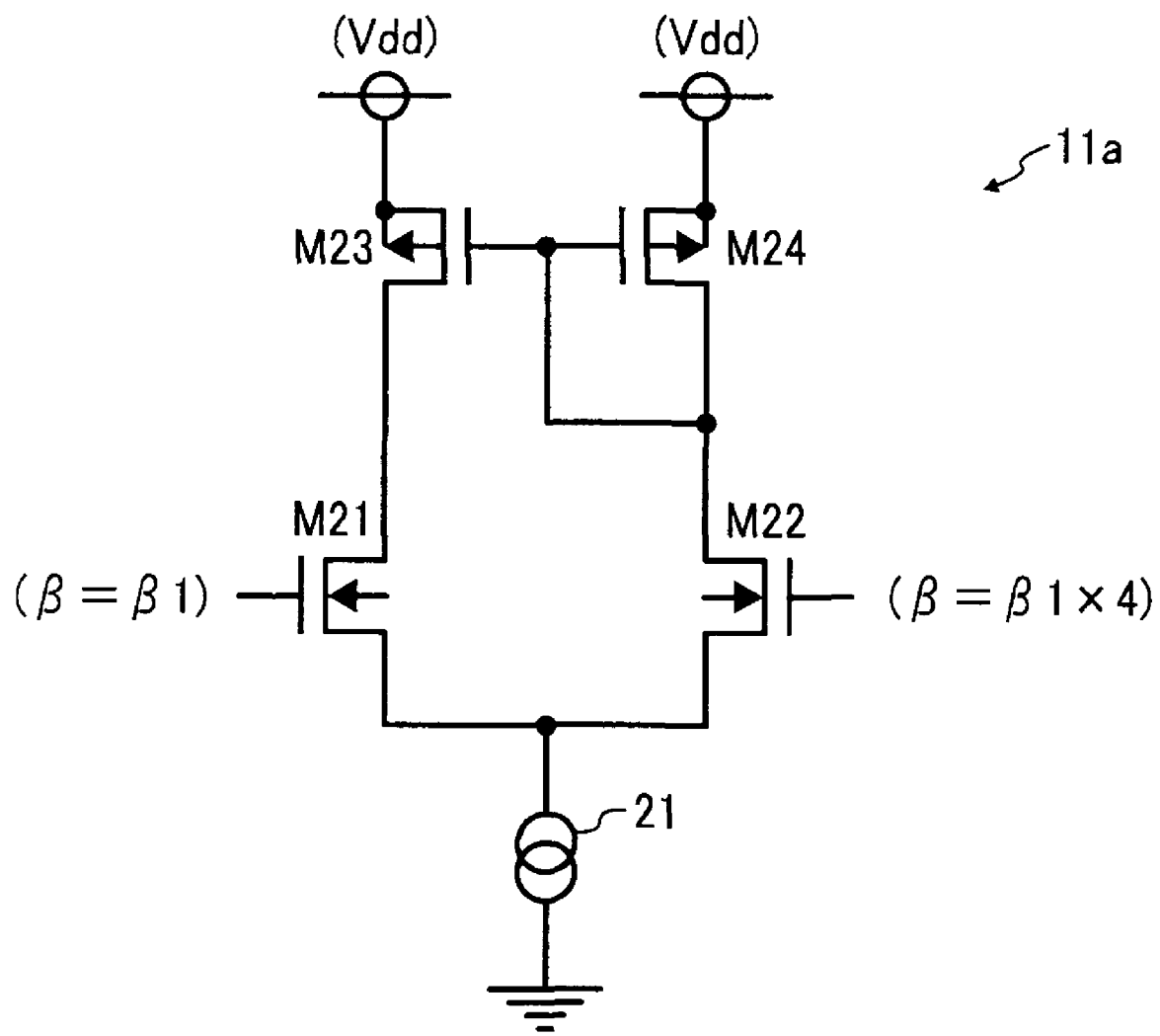
FIG. 6 is a circuit diagram of a differential amplifier used in the reference circuit of FIG. 5.

FIG. 6 is a circuit diagram of the differential amplifier 11a used in the current-to-voltage conversion circuit 2a. In FIG. 6, the differential amplifier 11a includes NMOS transistors M21 and M22, PMOS transistors M23 and M24, and a current source 21. The NMOS transistors M21 and M22 are a pair of input transistors, and the PMOS transistors M23 and M24 are load transistors to form a current mirror circuit. The current source 21 supplies a predetermined constant current to each input transistor M21 and M22. Each source of the PMOS transistors M23 and M24 is connected to a power supply terminal that supplies a voltage of Vdd. Each gate of the PMOS transistors M23 and M24 is connected in common, and a connection node between each gate of the PMOS transistors M23 and M24 is connected to a drain of the PMOS transistor M24.

A drain of the PMOS transistor M23 is connected to a drain of the NMOS transistor M21, and a drain of the PMOS transistor M24 is connected to a drain of the NMOS transistor M22. Each source of the NMOS transistors M21 and M22 is connected in common, and the current source 21 is connected between ground and a connection node between each source of the NMOS transistors M21 and M22. A gate of the NMOS transistor M21 is an inverted terminal of the differential amplifier 11a, and a gate of the NMOS transistor M22 is a non-inverted terminal of the differential amplifier 11a.

In this circuit configuration, the NMOS transistors M21 and M22 are formed to have different sizes so that the differential amplifier 11a has an input offset.

Generally, when a gate-source voltage between a gate and a source is Vgs and a threshold voltage is Vth, a saturation current id of the MOS transistor is expressed by a following formula (5), $$Id = \beta/2 \times (Vgs - Vth)^2$$

$$\beta = \mu \times Cox \times (W/L) \quad (5)$$

where µ is mobility, Cox is unit capacitance of oxide, W is a channel width, and L is a channel length. In this formula, a channel length modulation term is omitted.

Rewriting formula (5), the gate-source voltage can be expressed by a following formula (6), $$Vgs = (2 \times id/\beta)^{1/2} + Vth \quad (6)$$

When β of the NMOS transistor M22 is made to have 4×β1 where β of the NMOS transistor M21 is β1, a voltage difference ΔVgs between the gate-source voltage Vgs of the NMOS transistors M21 and M22 is expressed by a following formula (7), $$\Delta Vgs = (2 \times id/\beta 1)^{1/2} + Vth - [\{2 \times id/(4 \times \beta 1)\}^{1/2} + Vth] = (2 \times id/\beta 1)^{1/2}/2 \quad (7)$$

Thus, since the NMOS transistors M21 and M22 have different values of β, the gate-source voltages Vgs of the NMOS transistors M21 and M22 are different. Accordingly, it is possible to set a large offset voltage larger than an input offset caused by variation during fabrication.

As above-described, in the charge-up circuit 1a according to the second example embodiment, the differential amplifier 11a has input transistors formed of NMOS transistors to have different values of β for the NMOS transistors, so that it is possible to set a large offset voltage larger than an input offset caused by variation during fabrication. The charge-up circuit 1a can prevent the monitor voltage CCMON from becoming 0 v in addition to providing an effect similar to that of the charge-up circuit 1 according to the first example embodiment. Accordingly, it is possible to convert a charge-up current $i_{chg}$ to a voltage safely. Consequently, it is possible to adjust reference voltage CCREF more accurately so as to obtain a desired charge-up current $i_{chg}$.

Numerous additional modifications and variations are possible in light of the above teachings. It is therefore to be understood that, within the scope of the appended claims, the disclosure of this patent specification may be practiced otherwise than as specifically described herein.

This patent specification is based on Japanese Patent Application, No. 2007-217223 filed on Aug. 23, 2007 in the Japanese Patent Office, the entire contents of which are incorporated by reference herein.

What is claimed is:

1. A charge-up circuit, comprising:
a charge-up transistor that supplies a charge-up current to a secondary battery in accordance with a control signal;

a detection resistor connected in series with the charge-up transistor to detect the charge-up current;

a current-to-voltage conversion circuit that generates and outputs a monitor voltage in accordance with the charge-up current based on each voltage at both end terminals of the detection resistor;

a reference voltage generator that generates a predetermined reference voltage and includes a voltage adjusting mechanism to generate the reference voltage from the constant voltage so that the charge-up current becomes a desired current; and a charge-up current control circuit that controls the charge-up transistor so that the monitor voltage becomes the reference voltage, wherein the current-to-voltage conversion circuit comprises a differential amplifier including inputs thereof coupled to respective terminals of the detection resistor, said differential amplifier outputting an amplified voltage, and wherein the differential amplifier includes input transistors that are configured to have respectively different current drive capacities, and the difference in the current drive capacities of the input transistors of the differential amplifier permitting an input offset voltage of the differential amplifier to be increased and varied with a different degree from a predetermined input offset voltage value caused by production tolerance or variations in fabrication, said difference in the current drive capacities of the input transistors of the differential amplifier causing said input offset voltage of the differential amplifier to be larger than the predetermined input offset voltage value caused by production tolerance or variations in fabrication.

2. The charge-up circuit of claim 1, wherein the reference voltage generator including:

a constant voltage generator configured to generate a predetermined constant voltage; and a dividing circuit configured to divide the constant voltage using a variable resistor to output a divided voltage as the reference voltage, wherein the reference voltage is adjusted by adjusting a resistance of the variable resistor.

3. The charge-up circuit of claim 2, wherein the resistance of the variable resistor is adjusted by trimming the variable resistor.

4. The charge-up circuit of claim 1, wherein the input transistors of the differential amplifier have different transistor sizes.

5. A control method used in a charge-up circuit, the charge-up circuit including:

a charge-up transistor configured to supply a charge-up current to a secondary battery in accordance with a control signal;

a detection resistor connected in series with the charge-up transistor to detect the charge-up current; and a differential amplifier including inputs thereof coupled to respective terminals of the detection resistor, said differential amplifier outputting an amplified voltage, the control method comprising:

providing the differential amplifier with input transistors that are configured to have respectively different current drive capacities, the difference in the current drive capacities of the input transistors of the differential amplifier permitting an input offset voltage of the differential amplifier to be increased and varied with a different degree from a predetermined input offset voltage value caused by production tolerance or variations in fabrication, said difference in the current drive capacities of the input transistors of the differential amplifier causing said input offset voltage of the differential amplifier to be larger than the predetermined input offset voltage value caused by production tolerance or variations in fabrication;

generating, by the differential amplifier, a voltage in accordance with the charge-up current based on each voltage at both end terminals of the detection resistor; and controlling the charge-up transistor so that a generated voltage becomes a predetermined reference voltage, wherein the reference voltage is adjusted so that the charge-up current becomes a desired current.

6. The control method according to claim 5, further comprising:

generating the reference voltage by dividing a predetermined constant voltage by a predetermined ratio; and adjusting the ratio so that the charge-up current becomes a desired value.

7. The control method according to claim 6, wherein a resistance of a variable resistor of the charge-up circuit is adjusted so that the charge-up current becomes a desired value.

8. The control method according to claim 7, wherein the resistance of the variable resistor is adjusted by trimming.

9. The charge-up circuit of claim 1, wherein the first input offset voltage corresponds to a voltage difference between the inputs of the differential amplifier caused by the difference in the current drive capacities of the input transistors.

10. The charge-up circuit of claim 1, further comprising:

a first resistor that bridges the detecting resistor to a first input of the differential amplifier;

a first transistor including a gate thereof connected to an output of the differential amplifier, a current input terminal connected to the first resistor and the first input of the differential amplifier, and a current output terminal; and a second transistor connected to the current output terminal of the first transistor.

11. The charge-up circuit of claim 1, wherein the differential amplifier further comprises:

load transistors connected to the input transistors, respectively, of the differential amplifier, gates of the respective load transistors being connected to each other; and a current source connected to the input transistors of the differential amplifier.

* * * * *

UNITED STATES PATENT AND TRADEMARK OFFICE
CERTIFICATE OF CORRECTION

PATENT NO.        : 8,274,259 B2
APPLICATION NO.   : 12/189414
DATED             : September 25, 2012
INVENTOR(S)       : Keiichi Ashida It is certified that error appears in the above-identified patent and that said Letters Patent is hereby corrected as shown below:

On the title page item [75] should read

-- (75)  Inventor:  Keiichi ASHIDA, Osaka (JP) --

Signed and Sealed this
Twenty-second Day of January, 2013

David J. Kappos
*Director of the United States Patent and Trademark Office*